June 22, 1937.   B. ANDERSEN ET AL   2,084,372
SEASONING OF PLASTIC MATERIAL
Filed Feb. 24, 1934
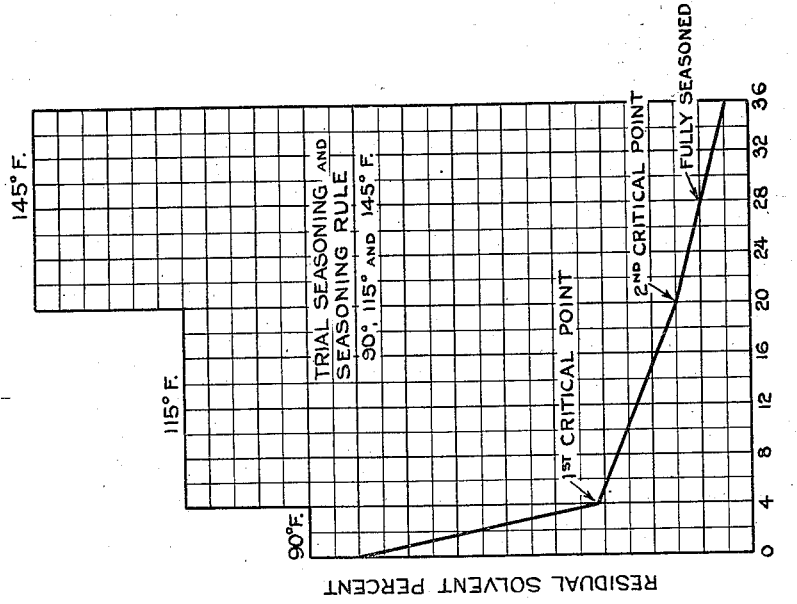
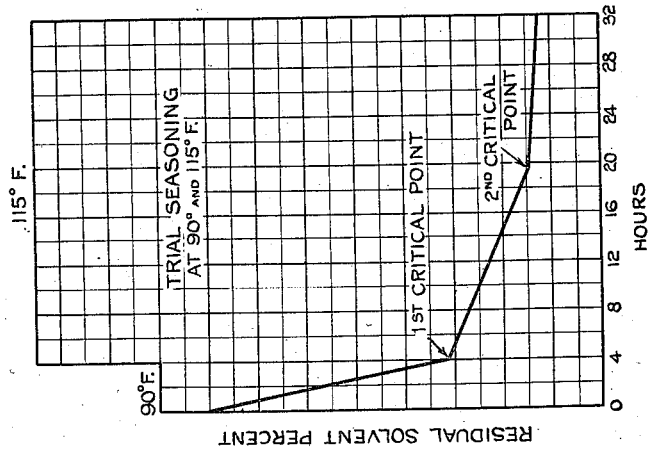
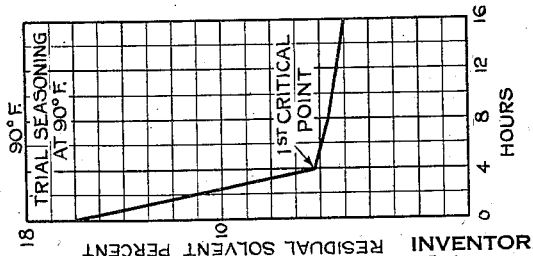
INVENTORS
Bjorn Andersen and
Ernst A Grenquist
BY
ATTORNEY Patented June 22, 1937

2,084,372

UNITED STATES PATENT OFFICE 2,084,372

SEASONING OF PLASTIC MATERIAL

Bjorn Andersen, Maplewood, and Ernst A. Grenquist, Bloomfield, N. J., assignors to Celluloid Corporation, a corporation of New Jersey Application February 24, 1934, Serial No. 712,716

7 Claims. (Cl. 34—24)

This invention relates to an improved method for seasoning or removing the solvent from plastic materals such as those containing cellulose esters, plasticizers and solvents.

An object of the invention is the economic and shortened, in respect to time, curing of plastic materials. Another object is the production of sheets, slabs, films, etc., that are uniform in residual solvent and free from bulges, blisters and other defects commonly caused in seasoning operations.

In the drawing:

Fig. 1 is a graphic chart illustrating the method of obtaining the first critical point for use in making a seasoning formula.

Fig. 2 is a graphic chart illustrating the method of obtaining the second critical point for use in making a seasoning formula.

Fig. 3 is the graphic formula obtained in part from the data of Figs. 1 and 2.

The usual method of seasoning sheets, etc., formed by cutting them from blocks of plastic material or formed by casting the plastic material on a smooth surface, from which it is stripped after partial drying, or formed by any of the extrusion methods, has been to place the sheets between blotter pads which are stacked in driers (known as blowers) with circulating air at a temperature of about 90° to 100° F. for sufficient time to stiffen the sheet for ease in subsequent handling and to prevent excessive warpage. The sheets are then hung in vaults at a constant temperature ranging from 90° to 120° F. for a length of time until the sheets have attained a minimum residual solvent content. The time usually employed for .020" gauge sheets was one day in the blowers at 95° F. and eight days in vaults at 115° F., while sheets of .250" gauge required six days in blowers at 95° F. and forty days in vaults at 115° F. It can be readily seen that such practice, particularly with respect to sheets of heavy thicknesses, means long delay between the receipt of an order and the possible delivery date, and also extremely large inventories of material in the state of being processed.

By employing the solvent removing process of this invention there results a saving of time from 80% to 95% of the usual time employed in seasoning the plastic material. This process results in immediate deliveries, saving of floor space, and a great reduction in inventory of materials in process. By moving the material quickly there is less fire and explosion hazards.

According to our invention we season plastic materials by increasing the temperatures at definite predetermined intervals varying with the formula (type of cellulosic material and total plasticizer content) and gauge of the material, and so apply the temperature that the increase coincides with the so-called critical points of the seasoning curve.

It is important that at no time during the seasoning period should the temperature of the material be permitted to relapse, but on the contrary there should rather be a progressive increase in temperature conversely to the solvent content of the material while in seasoning. Seasoning time of pyroxylin and cellulose acetate plastics are reduced from 80% to 95% over previous practice, without injury to the material. This quick seasoning permits also of economical recovery of the solvent vapors by absorption in active carbon or by other well known methods.

It has for many years been a great drawback to the cellulose ester plastic industry that its products had to be seasoned or cured for a considerable length of time before the material was fit to send to customer or manufactured into finished articles. The long seasoning or curing was required to remove the excess solvents used in processing. These solvents are usually of a relatively low boiling point, say from 50° to 150° C. and if not removed from the material before fabrication, would cause the finished products to warp and shrink.

A certain small amount of these low boiling solvents, which may be termed the permanent residual solvent, will be retained in the product practically indefinitely in ordinary use. The referred to solvent to be removed is the residual solvent in excess of the permanently retained residual solvent. The permanently retained residual solvent will vary with the total plasticizers or softeners used in the cellulosic plastic. The higher the total softener and plasticizer content the lower will be the percentage figure for the permanently retained residual solvent. For example, considering cellulose acetate plastic containing a total of 45 parts of plasticizer per 100 parts of cellulose acetate, then .5% to 1.5% of the solvent may be termed the permanently retained residual solvent, while in the cellulose acetate plastic with 30 parts of plasticizer per 100 parts of cellulose acetate, 1.5% to 2.5% of the solvent may be termed the permanently retained residual solvent.

If the seasoning curve is set down on a graph paper with the residual solvent in percent as ordinates and the seasoning time as abscissae, it will be seen that for cellulosic plastic material, the seasoning curve reveals three quite distinct portions; the original steep portion of the curve showing a more or less constant rate solvent loss indicating straight evaporation, that is, equal amounts of solvent being removed at unit time at a given temperature. This constant rate portion is followed by a falling rate portion, that is, decreasing amounts of solvent being removed per unit time. The two portions of the curve are joined together in a critical point, the turning point of the curve. If the seasoning curve is prolonged still further, it will finally flatten out and run practically parallel to the abscissa.

The falling rate portion of the curve is indicative of diffusion of solvent from the interior of the material to the surface and its facility of escaping through the surface. This facility of escaping through the surface is counteracted by changes taking place in the surface of the material and also by a slower migration to the surface from the interior because of the decreasing concentration of the solvents in the material itself. During the course of drying the cellulosic plastic material contracts, especially the surface which becomes case-hardened, shows skin formations, becomes non-porous or dense and exhibits such typical characteristics which are well known to those skilled in the art. This effect is the more marked the harder the basic formula. The result of this effect is that at a given temperature the drying curve may become practically flat and parallel to the time axis. This shows, in our belief, that the surface has contracted to such an extent that solvent diffusing from the interior is no longer capable of penetrating this crust and evaporating from the surface even if the temperature is raised. If the temperature is raised excessively high at this point in order to force the seasoning, blisters or cracks may develop in the surface, thus making the material unsuitable for commercial use.

In our new method of seasoning we start out at a relatively low seasoning temperature, say for example 90° to 95° F. or slightly above room temperature. The material is kept at this temperature until the critical turning point of the seasoning curve referred to above is reached. At this point, which must have been predetermined, the temperature is gradually raised to say 115° to 120° F. By so doing the case-hardening and closing up of the surface of the material is prevented. This rising temperature will cause an increase in the migration of the solvents from the interior of the stock to the surface so as to retain the surface soft and open and permit the solvents to escape freely through it. When the seasoning curve at this second seasoning temperature stage shows a tendency to flatten out, the temperature is again raised gradually as predetermined to say 140° to 160° F. By again raising the temperature at the critical point of the seasoning curve, we again prevent case-hardening by increasing the solvent migration to the surface and are able to season the material down to a satisfactory residual solvent, the "permanently retained residual solvent" desired.

It will, of course, be understood that the temperatures chosen above are only by means of illustration. Instead of having three main temperature ranges, the total seasoning time could be divided up in four or more temperature stages or the temperature throughout the whole seasoning could be rising gradually, being inversely proportional to the residual solvent obtaining in the material at corresponding times. We have also found that it is better to start with a material which has not too low a solvent content to begin with. If the rolled slab which goes to seasoning has a residual solvent below 10%, there is a chance that the slab already is case-hardened and the solvent content is not sufficient to open up the surface in the seasoning process to permit free migration of the solvent through the surface.

It is preferred, although not essential, to season sheet stock between blotters, since this will keep them clean and prevent surface dirt, buckling and warping. The sheets may be left between blotters for the total seasoning period.

In the drawing there is disclosed three figures representing graphically the effect of heat on the residual solvent in respect to time of a certain sample of plastic material. For each type of plastic material and each thickness of the sheets made from such there will necessarily be a distinct seasoning formula. These formulae may be ascertained by experiment on samples of each type or upon representative types, and the intermediate types given a formula deduced from comparison of the formula of the representative types. The figures in the drawing, however, will illustrate the method of ascertaining these formulae, which may be briefly stated as an increase in temperature at the critical points of solvent content inversely proportional to the remaining solvent content. The drawing shows but two critical points, although there may be many more found in more careful observation and the use of very sensitive instruments.

Fig. 1 shows the curve of residual solvent in a given sample heated to 90° F. in a "blower". It will be noticed that the curve after passing through the first critical point flattens out, and, although not shown, flattens out such that many days will be required to reduce the residual solvent to 2%, the amount of permanent residual solvent desired. However, by increasing the temperature at the first critical point to 115° F., the curve to the right of the critical point becomes less horizontal.

Fig. 2 shows graphically the effect of increasing the temperature at the first critical point from 90° F. to 115° F. By this graph it is seen that between the fourth and twenty-fourth hour the residual solvent is decreased to the same extent as would require many days at 90° F. At a certain point the rate of decrease in residual solvent, at this elevated temperature, markably decreases, giving a second critical point. As shown by Fig. 2, the line to the right of the second critical point flattens out and runs substantially horizontal. Thus, there is reached at the second critical point a reduction in the rate of evaporation, such that if the temperature is held constant, many days will be required to complete the evaporation. Surface alteration develops, resulting in a substantially prohibited evaporation of the solvent.

Fig. 3 graphically shows the effect of again increasing the temperature at the second critical point. By increasing the temperature to 145° F. the graph line of the evaporation curve becomes less horizontal crossing the fully seasoned line in eight hours. Fig. 3 represents the graphic formula for the particular type of plastic material being treated. Intermediate critical points may be ascertained and the temperature increased accordingly, resulting in a further saving of time. However, for commercial purposes two or three critical points and temperature are found sufficient.

This invention is applicable to cast, stuffed and rolled laminated glass stock, as well as stuffed and rolled slabs. The invention is also applicable to molded articles, rods and other shaped plastic articles. The invention may be applied to the seasoning of films in the usual film casting processes, to sheets cut from blocks, or to slabs taken directly from the malaxating rolls.

The plastic materials with a cellulosic base lend themselves exceptionally well to treatment according to this invention, and especally those with an ester of cellulose as the base. The examples of esters of cellulose are cellulose nitrates, preferably those of low nitrogen content as compared with the higher nitrates used in the powder industry, and the organic esters of cellulose, such as cellulose acetate, cellulose formate, cellulose propionate and cellulose butyrate. Cellulose ethers, such as ethyl cellulose, methyl cellulose and benzyl cellulose, may be employed.

The plastic materials may contain besides the cellulosic material, such plasticizers and softeners as deemed necessary for the purpose intended of the plastic material, the quantity and nature of which are fully understood by those skilled in the art. Examples of such plasticizers and softeners are camphor, tricresyl phosphate, triphenyl phosphate, dibutyl phthalate, diethyl phthalate, monoethyl-para-toluene sulfonamide, monomethyl xylene sulfonamide, dibutyl tartrate, phthalic acid di-ester of hypothetical methylene glycol monomethyl ether and like substances or mixtures of such plasticizers and softeners.

In order to mix, gelatinize and perform other operations upon the plastic material there may be added volatile solvents usually employed in the art. Examples of such solvents are ethyl alcohol, acetone, mixtures of acetone and ethyl or methyl alcohol, chloroform, ethylene dichloride, mixtures of ethylene dichloride and ethyl or methyl alcohol, mixtures of methyl chloride and ethyl or methyl alcohol and similar substances. A mixture of solvents having boiling points differing from each other may be employed.

The plastic material may also contain effect materials such as coloring matter, dyes, lakes, pigments, filling materials, fire retardants and lubricants. Coloring material is protected by the seasoning method of this invention and less care need be exercised to prevent the colors from becoming fugitive. Sheets containing very delicate colors may be seasoned by this invention, the color in which remains uniformly distributed and of an even shade throughout the sheet.

It is to be understood that the foregoing detailed description is given merely by way of illustration and many variations may be made therein, without departing from the spirit of our invention.

Having described our invention, what we desire to secure by Letters Patent is:

1. The method of seasoning thermoplastic materials containing a substitution derivative of cellulose and residual solvent, which comprises subjecting the same to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

2. The method of seasoning plastic materials containing cellulose acetate and residual solvent, which comprises subjecting the same to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

3. The method of seasoning plastic materials containing nitro-cellulose and residual solvent, which comprises subjecting the same to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

4. The method of seasoning thermoplastic materials containing a substitution derivative of cellulose and at least 10% of solvent, which comprises subjecting the same to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

5. The method of seasoning thermoplastic materials containing an organic substitution derivative of cellulose and at least 10% of solvent, which comprises subjecting the same to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

6. The method of seasoning thermoplastic materials in sheet form and containing a substitution derivative of cellulose and residual solvent, which comprises covering the sheets with an absorbent material and subjecting them to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

7. The method of seasoning thermoplastic materials in sheet form and containing an organic substitution derivative of cellulose and residual solvent, which comprises covering the sheets with an absorbent material and subjecting them to successively increasing temperatures, each temperature being that at which the maximum amount of solvent is removed at a substantially constant rate of evaporation, change in temperature being effected only when the rate of evaporation of solvent at the immediately preceding temperature commences substantially to decrease.

BJORN ANDERSEN.
ERNST A. GRENQUIST